Jan. 22, 1929.
C. H. McKAY
1,699,746
SAW CONSTRUCTION
Filed May 19, 1927
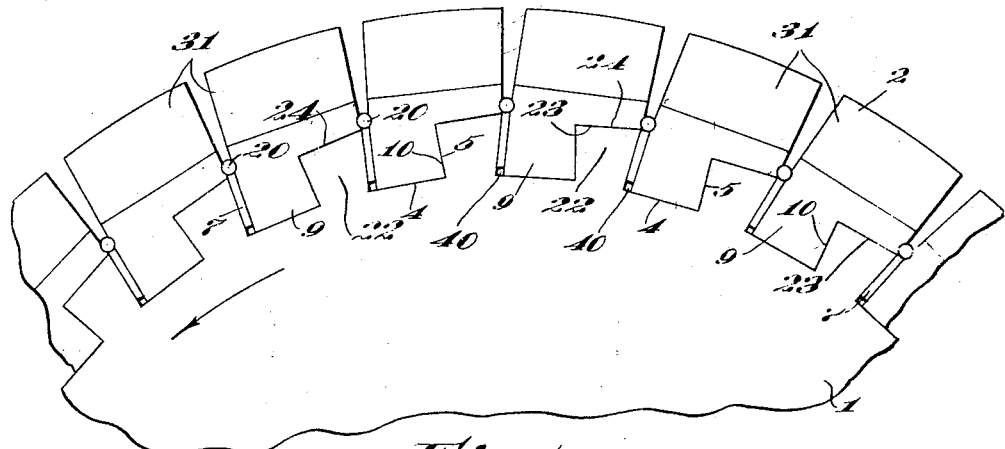
Fig.1
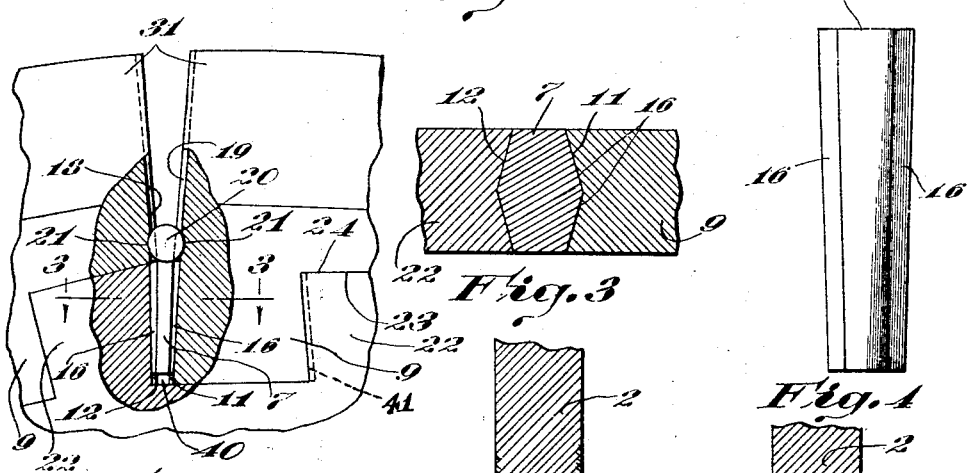
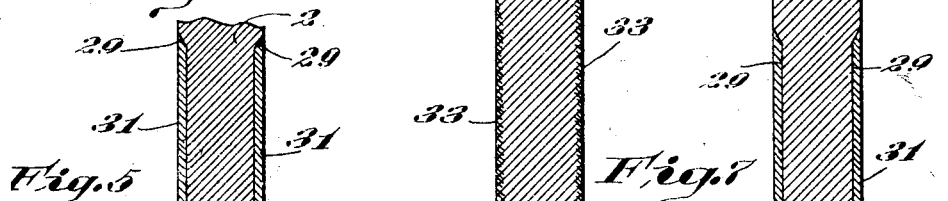
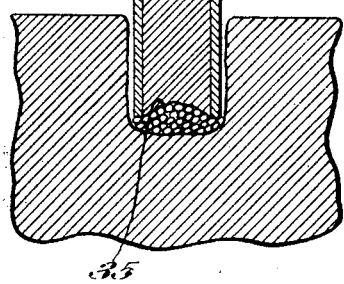
Inventor
Charles H. McKay
by Roberts Cushman & Woodbury
Attys.

Patented Jan. 22, 1929.

1,699,746

UNITED STATES PATENT OFFICE.

CHARLES H. McKAY, OF FITCHBURG, MASSACHUSETTS, ASSIGNOR TO SIMONDS SAW AND STEEL COMPANY, OF FITCHBURG, MASSACHUSETTS, A CORPORATION OF MASSACHUSETTS.

SAW CONSTRUCTION.

Application filed May 19, 1927. Serial No. 192,612.

This invention relates to an improvement in saws and is more particularly applicable to saws having inserted teeth and to disk saws which are designed for cutting stone.

The present invention discloses an improved form of fastening means for firmly securing inserted teeth in place upon the edge or periphery of the saw plate or disk. This fastening means permits a considerable portion of each of the saw teeth to bear upon a substantially circumferential surface of the saw disk and permits reliance upon the metal of the saw plate itself in cooperation with the metal of the tooth base to hold the tooth in place, an auxiliary wedge and pin being depended upon merely to hold the saw teeth in proper position upon the plate. The radial edges of the teeth have grooved portions which permit location of the wedges in their operative position and which also constitute guideways for directing abrasive such as shot toward the cutting edges of the teeth.

The present invention discloses a new form of saw tooth construction which is particularly advantageous when used upon saws for cutting stone, especially hard stone such as granite. Heretofore saws for this character of work have been provided with teeth of comparatively soft steel, and suitable abrasive material such as sand, shot and the like has been fed to the cutting portion of the saw in order to aid the cutting action thereof; soft steel being desirable for this purpose since metal of this character bites or engages the abrasive better than a harder steel such as tool steel or the like. This has resulted in the rounding off or wearing away of the corners of the tooth edges adjoining the cutting edges, and consequently in a considerable reduction in cutting speed and efficiency after the teeth have been in use for only a comparatively short period of time, and furthermore has necessitated the frequent replacement of teeth. The present invention is designed to retain the advantages which emanate from the use of soft steel and yet to avoid the rapid wearing and frequent renewal of saw teeth which has resulted from the use of this type of teeth. For this purpose the faces of the saw teeth may be made of hardened metal while the main intermediate portions may be formed of soft steel such as has previously been used.

A composite tooth of this character is designed to prevent the rapid wearing of the corners adjoining the cutting edges of the teeth and, in fact, the intermediate portions of the cutting edges may wear more rapidly than the edges thereof so that the gradual formation of a shallow groove results from the use of the tooth, permitting concentration of abrasive at the cutting edge and a more efficient cutting action. When a tooth of this character is combined with the improved tooth securing means disclosed herein, the groove which is used in conjunction with the fastening means upon the radial edges of the tooth cooperates with the grooves thus formed by the action of the abrasive material so that rotation of the saw causes the abrasive to be thrown centrifugally outward and to be guided by the grooves upon the radial edges of the teeth to a position wherein the abrasive is engaged by the grooves upon the cutting portions thereof.

The above and further advantageous features of the invention will be apparent to those skilled in the art upon a reading of the subjoined description and claims in conjunction with the accompanying drawings in which Fig. 1 is an elevational view of a portion of a disk saw having the improved form of teeth mounted in the preferred manner;

Fig. 2 is an elevational detail of a portion of the saw teeth and the securing means for the same;

Fig. 3 is an enlarged section on line 3—3 of Fig. 2;

Fig. 4 is an enlarged elevational view of the key or wedge for retaining the teeth in place;

Fig. 5 is a cross-sectional view of the cutting portion of the saw tooth as it engages a portion of a stone which is shown in section;

Fig. 6 is a cross-sectional view of the cutting portion of another form of stone cutting tooth; and Fig. 7 is a cross section of the cutting portion of the saw tooth.

The accompanying drawings, which exemplify the present invention, show a saw plate or disk 1 which may be mounted in the conventional manner and has teeth 2 inserted about its periphery. The disk is provided with peripheral notches 4 each of which has an undercut portion 5 formed by making one wall, e. g. the rear wall, of the notch inclined at an acute angle to the radius of the disk. The opposite wall of the notch 4 may extend substantially in a radial direction but preferably is grooved to engage a suitable wedge 7.

Each tooth comprises a body portion which is located outwardly of the outmost portion of the disk 1 and a base portion 9 which is adapted to engage the notch 4 and which has a rearwardly inclined surface 10 adapted to fit the undercut 5, thus the base portion of each tooth is of substantially trapezoidal form as viewed in side elevation. A suitable tongue 41 upon this edge may engage a groove in the undercut portion 5 of the notch, if desired, in order to provide additional lateral support. The front portion of the base 9 of each tooth is provided with a groove 11 which may correspond to the groove 12 in the adjoining wall of the notch. Between the grooves 11 and 12 is normally located the wedge member 7 which may preferably be of the form disclosed in Figs. 3 and 4, having parallel side faces which may be spaced transversely at a distance substantially corresponding to the similar dimensions of the saw plate and teeth, and having front and rear portions defined by faces 16 which meet each other at an obtuse angle and which are adapted to engage complementarily shaped portions of grooves 11 and 12. The key 7 is slightly tapered so that it may be driven between the grooves 11 and 12 in order to force the portion 10 of the tooth firmly against the undercut 5 of the plate in order to lock the tooth firmly in place. In order to permit interposition of the wedge between the plate and tooth base in this manner, adjoining portions of the tooth edges are grooved as designated by numerals 18 and 19 in order to provide extensions of grooves 12 and 11 respectively, Fig. 2. A clearance 40 is normally left adjoining the bottom of the keyway in order to permit manufacture of the key and cooperating grooves within reasonable mechanical tolerances and to permit ready removal of the wedge by interposition of a suitable tool between the bottom of the notch and the inner end of the wedge.

In order positively to insure against accidental loosening of the wedge, I provide the locking pin 20 which preferably may be in the form of a rivet engaging segmental notches 21 upon adjoining radial edge portions of the teeth. It is to be understood that this locking pin merely serves to prevent loosening or radial movement of the wedge and that it is not depended upon for holding the teeth in place. The undercut form of notch and the complementarily shaped tooth base compose unusually sturdy means for holding the tooth in place; the wedge 7 is held against sidewise movement by the arrangement of surfaces 16 and grooves 18 and 19, and from endwise movement by pin 20 so that even breakage of the wedge will not result in loosening of the inserted tooth.

Defining the notches 4 are the spaced plate extensions 22 which are provided with outer face portions 23 which extend longitudinally in a direction which is substantially tangential to that portion of the saw disk. Each tooth is provided with a surface 24 which is adapted to bear radially upon surface 23 while the bottom of base portion 9 bears upon the bottom of the notch so that each tooth has a large surface area bearing directly upon peripheral surfaces of the saw plate, thus providing sturdy means for receiving the shock and impacts due to the cutting action. The front edge of each tooth is inclined slightly to the radial direction in the conventional manner and the rear edge of the tooth may extend substantially radially, as shown.

The body portions of each of the teeth are preferably formed of soft steel, for example, steel of low carbon content. Adjoining the cutting edges of the teeth upon either face thereof are the rabbets or cut-away portions 29. Located within each of these cut-away portions are the steel plates 31 which preferably are of comparatively high carbon content and are welded or otherwise firmly secured in place. The composite tooth thus formed may then be suitably heat treated to effect the hardening of the faces thereof due to their high carbon content while the body portion of the tooth will not be appreciably hardened. Thus in effect the intermediate body portion of the effective cutting section of the tooth is formed of soft steel which is adapted to cooperate most effectively with the abrasive material in order to cut stone, while the face portions of each tooth comprising the laminations of harder steel may be formed of material which resists abrasion and therefore impedes wearing or rounding of the corners of the cutting edges of the teeth.

A tooth of this character under proper conditions of hardening and the usual conditions of subsequent use will tend to wear to the form illustrated in Fig. 5, from which it is evident that the abrasive forms a shallow groove 35 between the hardened outer portions of the tooth. Obviously a similar end may be attained in various other ways; for example, the faces of the teeth may have case hardened portions, as designated by numeral 33, Fig. 6. In other cases it may be desirable to provide a steel tooth of fairly high carbon content to harden the same and then to anneal or otherwise soften the intermediate portion thereof; it being evident that in any case the provision of a saw tooth having hardened outer face portions and a soft intermediate portion at its cutting edge is within the purview of the invention.

Obviously the grooves formed in the edges of the teeth to permit location of wedge 7 in place and the groove thus worn upon the cutting edge of the teeth cooperate in effecting a concentration of abrasive at the cutting edge, which permits cutting efficiency superior to that attainable for a saw which constantly tends to cast the abrasive out at either side.

I claim:

1. A saw construction comprising a saw plate having a series of notches at its edge, said notches being undercut, and having a bottom wall extending in the same general direction as the adjoining edge of the plate, saw teeth having a base portion adapted to engage undercut portions of the notches and to bear upon the bottom walls of the same, gradually tapered keys engaged with the base portions opposite the undercuts and retaining them against the same, and transverse pins engaging said teeth independently of said keys to lock the keys in place.

2. A saw tooth comprising a body portion of comparatively soft steel and face sections of harder steel whereby rounding of marginal portions of the cutting edges of the saw is impeded.

3. A saw tooth comprising a body portion of comparatively soft steel and face sections of harder steel secured to either side thereof, whereby rounding of marginal portions of the cutting edge of the saw is impeded.

4. A saw tooth comprising a body portion of comparatively soft steel and face sections of harder steel welded upon the faces of the body section at the cutting edge thereof, whereby rounding of marginal portions of the cutting edge of the saw is impeded.

5. A saw tooth comprising a body portion of comparatively low carbon steel and face sections of higher carbon steel secured to either side thereof, whereby rounding of marginal portions of the cutting edge of the saw is impeded.

6. An insertable saw tooth for use upon disk saws with abrasive, comprising an intermediate portion of comparatively soft steel, outer face portions of harder steel terminating adjoining the cutting edge of the tooth, a groove in an edge of the tooth which is adapted to be substantially radially disposed on the disk, whereby abrasive may be guided outward by said groove and whereby a groove tends to be worn in peripheral portions of the tooth to receive said abrasive.

7. An insertable saw tooth for use with abrasive, comprising an intermediate portion of comparatively soft steel, outer face portions of harder steel terminating adjoining the cutting edge of the tooth, a groove upon an edge of the tooth which is adapted to be located at an angle to the path of saw movement, whereby abrasive may be guided outwardly by said groove and whereby a groove tends to be worn in the outer edge of the tooth to receive said abrasive.

8. A composite saw tooth having hardened outer face portions and a soft intermediate portion at its cutting edge.

9. A saw construction comprising a saw plate having a series of notches at its edge, saw teeth in said notches, keys for securing said teeth in said notches and pins for preventing outward endwise movement of said keys, each said pin engaging the radial edges of a pair of adjoining teeth.

10. A saw construction comprising a saw plate having a series of notches at its edge, saw teeth in said notches, keys for securing said teeth in said notches and pins for preventing endwise movement of said keys, said pins being held in place by said blades independently of said wedges.

11. A saw construction comprising a saw plate having a series of notches at its edge, saw teeth in said notches and having notches in the radial edge portions, keys for securing said teeth in said saw plate notches and pins for preventing outward endwise movement of said keys, each said pin engaging the notches in a pair of adjoining teeth.

12. A saw tooth construction comprising a saw disk having a series of notches at its edge, said notches being undercut, saw teeth having base portions engaging the undercut portions of the notches, substantially radially disposed keys wedged between a wall of each notch opposite its undercut portion and a substantially radially disposed edge of the base portion of the tooth, and grooves in the teeth adjoining their base portions, said grooves being aligned with the keys and permitting insertion of the same and also being adapted to act as guideways for abrasive cast outwardly under the action of centrifugal force.

Signed by me at Boston, Massachusetts, this 16th day of May, 1927.

CHARLES H. McKAY.